UNITED STATES PATENT OFFICE.

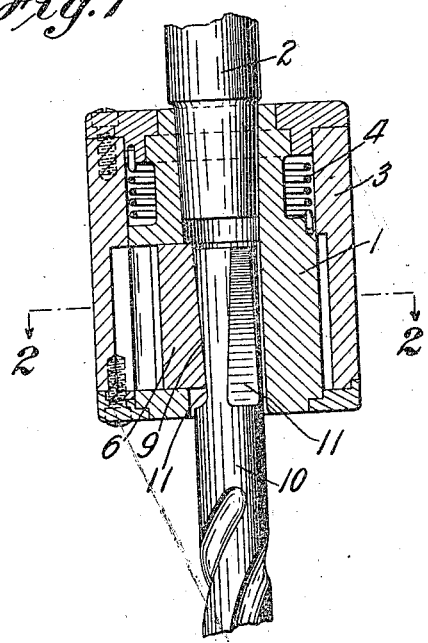

VERNER J. WAHLSTROM, OF BROOKLYN, NEW YORK, ASSIGNOR OF ONE-HALF TO BERNHARD T. BURCHARDI, OF BROOKLYN, NEW YORK.

DRILL AND CHUCK.

1,046,237.   Specification of Letters Patent.   Patented Dec. 3, 1912.

Application filed January 27, 1911. Serial No. 604,985.

*To all whom it may concern:*

Be it known that I, VERNER J. WAHLSTROM, a citizen of the United States, residing at Brooklyn, county of Kings, and State of New York, have invented a new and useful Improvement in Drills and Chucks, of which the following is a specification.

This invention relates to an improvement in drills and chucks, and it has for its main object the production of a semi-automatic chuck in which the gripping jaws are automatically moved toward the axis of the chuck and are shaped to prevent the drill from falling out when doing no work.

Another object is the production of a device in which the jaws are shaped with their outer ends lying nearer the axis of the chuck than the opposite ends and the drill is provided with clamping faces equaling in number the number of jaws in the chuck, said faces being nearer the axis of the drill at the outer end of the chuck than at the inner end of the drill.

With these and other objects not specifically mentioned in view, the invention consists in certain constructions and combinations which will be hereinafter fully described and then specifically set forth in the claims hereunto appended.

In the accompanying drawings, which form a part of this specification and in which like characters of reference indicate the same or like parts, Figure 1 is a sectional view of a device constructed in accordance with the invention, Fig. 2 is a sectional view taken on the line 2—2 in Fig. 1, and Fig. 3 is a detail view of a modified form of jaw and drill shank.

In carrying the invention into effect, there is provided a chuck body 1 into which is driven a shank 2 adapted to support the chuck in a drill press or like machine. The device is further provided with a shell 3 surrounding the body 1 and rotated by a spring 4. The body 1 is provided with three radial slots 5 in which are slidably mounted three jaws 6. A movement of these jaws toward the axis of the chuck is produced by a series of floating wedges 7 coöperating with cam faces 8 formed on the inner periphery of the shell 3.

The structure so far described is substantially the same as the structure shown and described in detail in my co-pending application No. 584,799, filed October 1, 1910, and reference is made thereto for a full detailed description. For the purpose of preventing a drill from falling out of the chuck when not working, the jaws are provided with operating faces 9 the outer ends of which lie nearer the axis of the chuck than the inner ends or ends nearest the shank 2.

A drill is provided which has a shank 10 provided with clamping faces 11 equaling in number the number of jaws in the chuck, and these clamping faces lie nearer the axis of the drill, and consequently nearer the axis of the chuck, at the outer end of the chuck than at the extreme end of the drill within the chuck. It will be readily understood that by this construction the engagement of the inclined jaws with the inclined faces of the drill will prevent the drill from falling out of the chuck when there is little or no clamping action of the jaws on the drill shank. Moreover, the flattened faces of the drill in contact with the flattened faces of the jaws assist in firmly holding the drill in position under strain.

In the modified form of jaw and drill shown in Fig. 3, it will be noted that the operating face 12 of the jaw 13 is convex while the clamping face 14 of the drill 15 is concave to coöperate with the face of the jaws.

Changes and variations may be made in the structure by means of which the invention is carried into effect. The invention, therefore, is not to be restricted to the precise details of the structure shown and described.

What is claimed is:

1. The combination with a drill having a shank provided with a plurality of long flat undercut clamping faces, of a chuck body provided with a central aperture larger than and adapted to receive the drill shank and having a plurality of slots opening into the aperture, a plurality of driving jaws within the slots and having long flat operating faces adapted for contact with the clamping faces of the drill shank, and means coöperating with the jaws to simultaneously move them into and toward the axis of the aperture to rigidly hold the drill centrally within but out of contact with the walls of the aperture.

2. The combination with a drill having a shank provided with a plurality of long flat undercut clamping faces, of a chuck body provided with a central aperture larger than and adapted to receive the drill shank and having a plurality of slots opening into the aperture, a plurality of driving jaws within the slots and having long flat operating faces adapted for contact with the clamping faces of the drill shank, and a shell rotatable on the chuck body and having a plurality of internal cam surfaces coöperating with the jaws through the rotation of the shell to simultaneously move them into and toward the axis of the aperture to rigidly hold the drill centrally within but out of contact with the walls of the aperture.

3. The combination with a drill having a shank provided with a plurality of long flat undercut clamping faces, of a chuck body provided with a central aperture larger than and adapted to receive the drill shank and having a plurality of slots opening into the aperture, a plurality of driving jaws within the slots and having long flat operating faces adapted for contact with the clamping faces of the drill shank, and a spring actuated shell rotatable on the chuck body and having a plurality of internal cam surfaces coöperating with the jaws through the rotation of the shell to simultaneously move them into and toward the axis of the aperture to rigidly hold the drill centrally within but out of contact with the walls of the aperture.

In testimony whereof, I have signed my name to this specification in the presence of two subscribing witnesses.

VERNER J. WAHLSTROM.

Witnesses:
FRANK H. VICK, Jr.,
SYDNEY I. PRESCOTT.